(12) United States Patent
Timus et al.

(10) Patent No.: US 7,899,484 B2
(45) Date of Patent: Mar. 1, 2011

(54) POWER CONTROL METHOD

(75) Inventors: Bogdan Timus, Sundbyberg (SE); Niklas Denkert, Solna (SE); Arne Simonsson, Gammelstad (SE); Jonas Pettersson, Luleå (SE); Mårten Ericson, Luleå (SE); Niclas Wiberg, Linköping (SE); Fredrik Gunnarsson, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 655 days.

(21) Appl. No.: 11/902,659

(22) Filed: Sep. 24, 2007

(65) Prior Publication Data

US 2008/0075030 A1 Mar. 27, 2008

Related U.S. Application Data

(63) Continuation of application No. 10/736,897, filed on Dec. 17, 2003, now abandoned.

(51) Int. Cl.
*H04B 7/00* (2006.01)

(52) U.S. Cl. .......................... 455/522; 455/453

(58) Field of Classification Search ................. 455/522, 455/69, 453; 370/320
See application file for complete search history.

(56) References Cited

U.S. PATENT DOCUMENTS

| | | | |
|---|---|---|---|
| 5,574,982 A | 11/1996 | Almgren et al. | |
| 5,991,618 A | 11/1999 | Hall | |
| 6,064,659 A | 5/2000 | Rohani et al. | |
| 6,212,399 B1 | 4/2001 | Kumar et al. | |
| 6,311,070 B1 | 10/2001 | Tong et al. | |
| 6,549,785 B1 | 4/2003 | Agin | |
| 2002/0016179 A1 | 2/2002 | Baker et al. | |
| 2003/0103470 A1 | 6/2003 | Yafuso | |
| 2003/0119541 A1* | 6/2003 | Ubuki et al. | 455/522 |
| 2003/0210660 A1* | 11/2003 | Wiberg et al. | 370/320 |

FOREIGN PATENT DOCUMENTS

| | | |
|---|---|---|
| EP | 0 815 656 B1 | 11/2002 |
| EP | 1 322 048 A1 | 6/2003 |
| WO | 00/04649 | 1/2000 |
| WO | 01/39540 A1 | 5/2001 |
| WO | 02/35371 A1 | 5/2002 |
| WO | 02/35731 A | 5/2002 |

OTHER PUBLICATIONS

Chinese Office Action and English translation thereof mailed Jul. 10, 2009 in corresponding Chinese application 200480037572.1.

(Continued)

*Primary Examiner*—Tu X Nguyen
(74) *Attorney, Agent, or Firm*—Nixon & Vanderhye, P.C.

(57) ABSTRACT

Methods for downlink power control in wireless communication systems are provided. In response to a transmitter power change request from a mobile terminal (110) over a wireless connection, a base station (122) determines a power control parameter based on its current total transmitter power $P_{DL}$. The power control parameter preferably relates to a maximum connection-specific transmitter power, a power step size and/or a power increase probability, and is used by the base station to distribute transmitter power $p_i$ to the connection.

26 Claims, 5 Drawing Sheets

OTHER PUBLICATIONS

International Search Report and Written Opinion mailed Apr. 21, 2005 in corresponding PCT application No. PCT/SE2004/0533334.

3GPP TS 25.214 (V5.6.0) Technical Specification Group Radio Access Network, Physical Layer Procedures (FDD) Sep. 2003, pp. 1-63.

3GPP TS 25.214 V5.6.0, $3^{rd}$ Generation Partnership Project: Technical Specification Group Radio Access Network Physical Layer Procedures (FDD) (Release 5), Sep. 2003.

Kurjenniemi et al, "Signaled Step Size for Downlink Power Control of Dedicated Channels in UTRA TDD", IEEE, 2002, pp. 675-679.

Lim et al, "Performance of Power Control Algorithms in Wideband CDMA Systems", 2002 Student Conferenc on Research and Development Proceedings, Shah Alam, Malaysia, IEEE, 2002, pp. 382-385.

Gunnarsson et al, "Power Control with Time Delay Compensation", Report No. LiTH-ISY-R-2274, Bubmitted BTC'00 Fall, Boston, MA, USA, Aug. 18, 2000.

EP Office Action mailed Oct. 4, 2010 in corresponding EP application 04804721.1.

* cited by examiner

POWER CONTROL METHOD

This application is a continuation of U.S. patent application Ser. No. 10/736,897, filed Dec. 17, 2003 no abandoned, which is incorporated herein by reference.

TECHNICAL FIELD

The present invention relates to downlink power control in wireless communication systems, such as Wideband Code Division Multiple Access (WCDMA) systems.

BACKGROUND

The main resource in a WCDMA downlink is the carrier power of the base station. The maximum carrier power limits the number of users that can be served, the service quality as well as the coverage of the base station. Each connection needs sufficient dedicated channel power to meet its associated quality requirement in terms of block error rate and thus provide acceptable perceived quality of service to the end user. Nevertheless, it is also important to utilize the power efficiently and not use more power than necessary, and therefore the transmitter power in the base station is regularly updated.

In WCDMA, fast power control is standardized for both up- and downlink. 3GPP, Physical layer procedures (FDD), Technical Specification TS 25.214. The user equipment (UE) sends transmitter power control (TPC) commands, i.e. 'power up' or 'power down' indications, to the network. These commands are used in the base station to update the dedicated power of the UE. The default algorithm is to stepwise update the power, using the TPC command to define whether the new power value is to be the previous power value plus or minus a fixed power step size. Provided that saturation does not occur, the power control command is always granted. There are two options associated with the default power control algorithm, the first of which reduces the risk of misinterpreted TPC commands, and the second limits the power raise of the power control through a sliding window size and a threshold.

The standardized power control algorithms in 3GPP are primarily designed for situations when it is possible to fulfil all service requirements and the mutual interference can be compensated for. However, since the radio environment is time varying, situations may arise where there is not sufficient carrier power in the base station to fulfil the service requirements of all users and there is a risk for unstable system behavior. Gunnarsson, F. and Gustafsson, F., Power Control with. Time Delay Compensation, *Proc. Vehicular Technology Conference*, Boston, Mass., USA, September 2000. Wireless communication systems are generally provided with means for admission control and means for disconnecting services, but these are relatively slow and not designed for handling system instabilities. Therefore, there is a need for mechanisms that are able to handle this on a small time scale with fast actions.

Several alternative power control algorithms have been proposed. In U.S. Pat. No. 5,574,982 to Almgren, et. al., for example, a quality target is gradually reduced when the dedicated channel power is increased. Essentially, this means that users requiring high powers have to put up with lower quality.

International patent application WO 02/35731 A1 addresses the problem of diverging transmitter output power levels of two or more base stations with respect to a mobile station in macro-diversity communication. The respective base station transmitter output powers for the mobile station are adjusted in response to the power control instructions from the mobile station and the respective current base station transmitter output powers for the mobile station. The adjustments can be performed in fixed or continuous steps.

Step size adjustments based on TPC history, mobility speed and bit error rate (BER) probability is e.g. described in the following documents: International Patent Application WO 00/04649; European patent application EP 0 815 656 B1; and U.S. Pat. No. 6,311,070 B1.

Although the above solutions have resulted in better downlink power control mechanisms they are still associated with problems. A drawback of prior art power control is for example that there is a considerable risk of overallocating or temporary running out of transmitter power. Insufficient power resources also result in that all connections are "punished", which makes the situation rather unpredictable for individual mobiles.

Accordingly, there is a need for an improved downlink power control method.

SUMMARY

A method for downlink power control that improves the stability of wireless communication systems and achieves efficient utilization of power resources in communication systems with shared resources. The method eliminates the risk of temporary running out of transmitter power, and provides a power control mechanism suitable for WCDMA systems.

Briefly, an example method involves an overall approach to downlink power control. In response to a transmitter power change request from a mobile terminal, a base station determines a power control parameter, such as a maximum connection-specific transmitter power, a power step size, or a power increase probability, based on its current total transmitter power. The power control parameter is then used by the base station to distribute transmitter power to the connection. By considering all connections associated with the base station (and not only the connection that is controlled) when allocating transmitter power to an individual connection, a more efficient power control method is achieved and the risk of overallocation can be eliminated.

In some advantageous example embodiments, power control is performed using the current total transmitter power together with other input parameters related to a connection-specific code power and/or information indicating the degree of priority associated with the connection.

According to other example aspects of the technology, a transceiver node, and a communication system are provided.

BRIEF DESCRIPTION OF THE DRAWINGS

The invention, together with further objects and advantages thereof, is best understood by reference to the following description and the accompanying drawings, in which.

DETAILED DESCRIPTION

Figure 1:
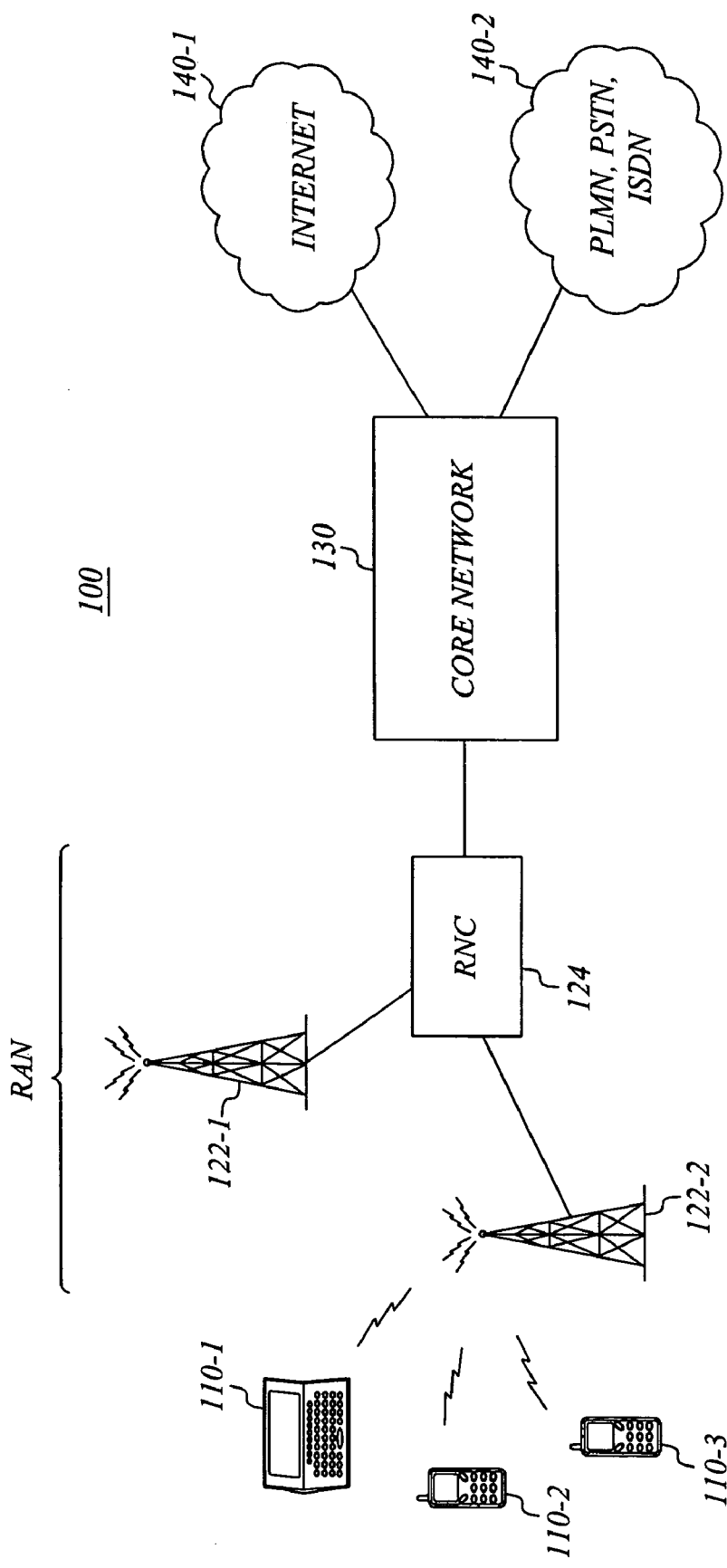
FIG. 1 is a schematic overview of an exemplary WCDMA communication system.

FIG. 1 is a schematic overview of an exemplary WCDMA communication system in which the present technology can be used. The illustrated system 100 comprises a Radio Access Network (RAN), e.g. a Universal Terrestrial Radio Access Network (UTRAN), and a core network 130. The RAN performs radio-related functions and is responsible for establishing connections between user equipment 110, such as mobile phones and laptops, and the rest of the network. The RAN typically contains a large number of Base Transceiver Stations (BTS) 122, also referred to as Node B, and Radio Network Controllers (RNC) 124. Each BTS serves the mobile terminals within its respective coverage area and several BTS are controlled by a RNC. Typical functions of the RNC are to assign frequencies, spreading or scrambling codes and channel power levels.

The RNC 124 provides access to the core network 130, which e.g. comprises switching centers, support nodes and databases corresponding to those of a Global System for Mobile communication/General Packet Radio Service (GSM/GPRS) core network, and generally also includes multimedia processing equipment. The core network communicates with external networks 140, such as the Internet, and Public Switched Telephone Networks (PSTN), Integrated Services Digital Networks (ISDN) and other Public Land Mobile Networks (PLMN).

In practice, most WCDMA networks present multiple network elements and nodes arranged in much more complex ways than in the basic example of FIG. 1.

The present technology is well suited for and will primarily be described in connection with WCDMA communication, for example High-speed Downlink Shared Channel (HS-DSCH) systems. Nevertheless, it should be understood that other communication systems where multiple users can utilize the same power resource simultaneously also lie within the scope of the technology. Systems where the power utilization of a node affects adjacent nodes due to high interference are also suited for the technology. Such systems for instance include time-multiplexed or code-multiplexed Orthogonal Frequency Division Multiplexing (OFDM) and Time Division Multiple Access (TDMA) systems and systems using Multi Carrier Power Amplifiers (MCPA).

Effective mechanisms for uplink and downlink power control are essential for maximizing the capacity of wireless communication systems like CDMA systems. Power control for the downlink (forward) channel in particular serves to provide each mobile station with a satisfactory signal level from the base station. Typically, the mobile station measures the received signal on the downlink channel and based on the measurements requests the base station to adjust its transmit power.

As mentioned in the background section, fast power control (1500 Hz) is in WCDMA standardized for both up- and downlink. The UE sends a transmitter power control command TPC(t) to the network 1500 times per second, and each command states either 'power up' or 'power down'. This command is used in the base station to update the dedicated power of the UE p(t). The 3GPP standardized downlink power control algorithms include one default algorithm with two options. 3GPP, Physical layer procedures (FDD), Technical Specification TS 25.214. The default algorithm is to step-wise update the power p(t) in logarithmic scale (in dB) every slot t, using the received transmitter power control command TPC(t), which is either +1 or −1 according to:

$$p(t+1) = p(t) + \Delta * TPC(t) \text{[dB]} \quad (1)$$

where Δ is the step size in dB. The step size Δ can have four values: 0.5, 1, 1.5 or 2 dB. It is mandatory for UTRAN to support a step size of 1 dB, while support of other step sizes is optional. The only reason for not granting the power control command is if the power saturates, i.e. the power meets the upper or lower limitations (p_upper and p_lower respectively), which are parameterized by the operator. This implies that:

$$p(t+1) = \max(p\_lower, \min(p\_upper, p(t) + d * TPC(t))) \text{[dB]} \quad (2)$$

The first option aims at limiting the risk of misinterpreted TPC commands. Each TPC command is repeated three consecutive slots, and the actual update rate is thereby reduced to 500 Hz. The second option limits the power raise of power control by defining a sliding window size Swin and a threshold th. The power is only allowed to increase if the sum of past Swin corrections is below the threshold th:

$$p(t+1) = \begin{cases} p(t) - \Delta & \text{if } TPC(t) = -1 \\ p(t) + \Delta & \text{if } TPC(t) = 1, TPCsum < th \\ p(t) & \text{if } TPC(t) = 1, TPCsum \geq th \end{cases} \quad (3)$$

where TPCsum is the sum of past corrections, i.e.

$$TPCsum = \sum_{k=t-Swin+1}^{t} TPC(k)$$

The present technology is based on the recognition that a most efficient downlink power control can be obtained by changing the power dedicated to a respective connection in response to the total transmitter power situation. The total transmitter power of the base station is a limited resource and it is therefore desirable to control the system with regard to this parameter. By measuring the total transmitter power of the base station and by controlling the system based thereon, a power control mechanism that directly responds to the most crucial power parameter can be achieved.

In order to enhance the system stability the present technology thus proposes an overall control approach where downlink power control is based on the total transmitter power of the base station. This will now be further described with reference to FIG. 2, in which a transceiver node 122 and two mobile terminals 110 are shown. The transceiver node is capable of communicating with the mobile terminals over respective wireless connections.

The transceiver node 122 is typically arranged at the network side, e.g. in a radio access network such as UTRAN, and enables wireless units to be connected to the rest of the network. The transceiver node can for instance comprise or be associated with a (radio) base station such as a Node B or a BTS and/or radio control functionality such as an RNC or a Base Station Controller (BSC). In the following, the transceiver node will generally be referred to as base station.

The wireless units/mobile terminals 110 (also referred to as user equipment, mobile nodes, mobile stations, etc) are illustrated as cellular phones. However, the invention is also applicable on communication with other wireless unit, including personal digital assistants and laptop computers.

Figure 2:
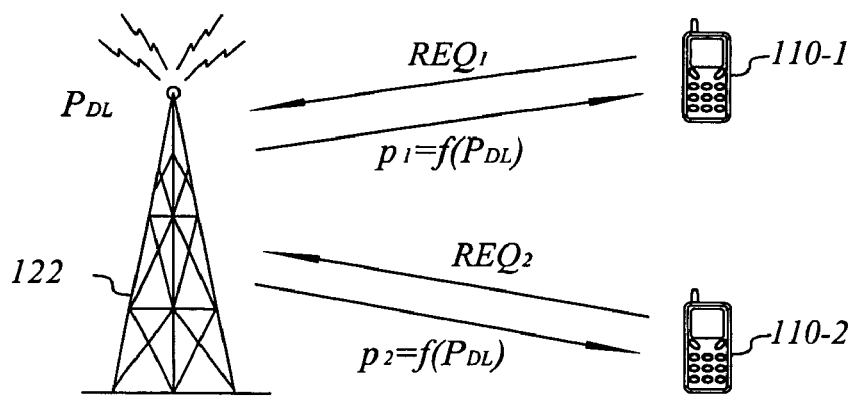
FIG. 2 illustrates downlink power control messaging in accordance with an example embodiment.

As indicated in FIG. 2, the base station is associated with a total transmitter (downlink) power $P_{DL}$, also referred to as downlink carrier power. This total transmitter power comprises both common power (used e.g. for pushing information to end users, for pilot signals and for common/shared channels) and power for channels dedicated to specific mobile terminals. The current total transmitter power $P_{DL}(t)$ represents all downlink power resources, common and connection-specific, used at the transceiver node at a particular point of time t. In other words, the total transmitter power is a measure of the overall resource allocation at the transceiver node. The available downlink power resources are represented by a maximum transmitter (downlink) power $P_{DL,max}$, which is transceiver node specific.

Also indicated in the figure are transmitter (downlink) powers $p_i$ for each connection i, also referred to as the downlink code power of a respective connection. The current connection-specific transmitter power $p_i(t)$ represents the downlink power allocated to connection i by the base station at a particular point of time t. By default, the code power allocation is performed according to the power control algorithm of Eq. (1), but according to the present technology this power allocation is handled in an improved way that will now be described.

The wireless unit 110 sends a request for a power change (e.g. a power increase command) to the base station 122. As opposed to with the above-described default power control algorithm, the request is not always granted. Based on the total transmitter power of the base station, it is decided whether the request should be granted or wholly or partially refused. The connection-specific power decision is expressed through one or several power control parameters, which preferably directly or indirectly relate to a maximum value or a power change rate of the connection-specific transmitter power. The power control parameters are determined based on the current total transmitter power of the base station and thereafter used to distribute transmitter power to the particular connection. Hence, the power $p_i$ dedicated to connection i depends on the total downlink power $P_{DL}$.

Figure 3:
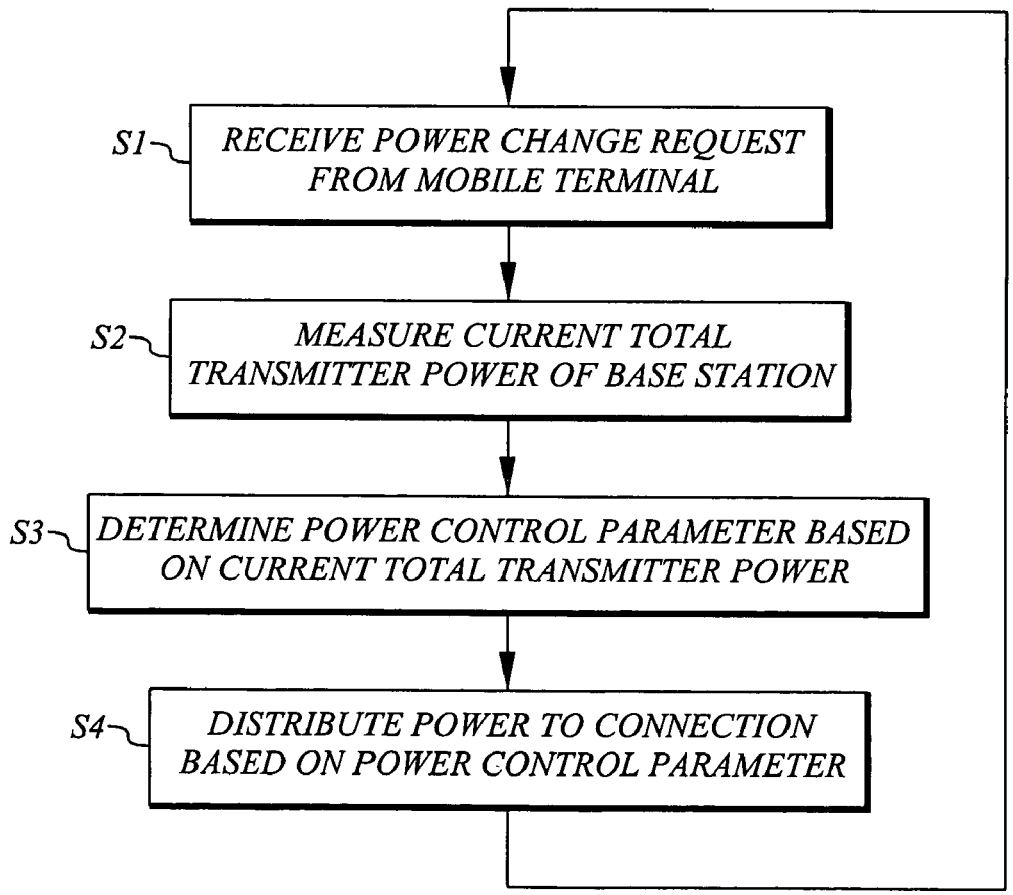
FIG. 3 is a flow chart of a method for downlink power control according to an example preferred embodiment.

FIG. 3 is a flow chart of a method for downlink power control summarizing the main principles of a preferred example embodiment. In step S1, a transmitter power change request from a mobile terminal is received at a base station over a wireless connection. This request can for example comprise a standard WCDMA TPC command and the technology is applicable to both increase and decrease commands. In particular, it is useful for handling situations with repeated power increase commands.

In response to the transmitter power change request, the base station determines at least one power control parameter based on its current total transmitter power in step S3. This preferably involves executing a predetermined power distribution function that presents a smooth transitional behavior as the current total transmitter power approaches its maximum value, or alternatively the power control parameter may be decided based on a predetermined threshold value for the total transmitter power. The power control parameter is preferably related to a maximum connection-specific transmitter power and/or the power change rate of the connection-specific transmitter power. The total transmitter power of the base station is preferably continuously measured at the base station (step S2). However, in some embodiments this parameter may be determined elsewhere and forwarded to the transceiver node. As will be explained in the following, the current total transmitter power is not necessarily the only input parameter affecting the power control parameters (besides the TPC value). The power control parameter can e.g. be an aggregate power control parameter calculated by combining several separately computed power control parameters with different inputs.

Finally, transmitter power is in step S4 distributed to the connection by the base station in accordance with the determined power control parameter. The power control parameter can be directly or indirectly affecting the actual power distribution. An example of the latter is to indirectly restrict the power (p(t) in Eq. (1)) through a power control parameter related to the highest bit rate allowed for the connection. The procedure in FIG. 3 is typically repeated regularly during an ongoing connection, since the mobile terminal will repeatedly ask for more or less power as the conditions change.

By means of the present technology, the behavior of respective connections is adjusted depending on the behavior of the entire shared power resource. Conventional methods for downlink power control focuses entirely on individual connections. Since the mobile terminal does not have any knowledge about the power situation for other links, this implies a considerable risk of overallocating or temporary running out of transmitter power. By instead considering the power behavior of other connections to/from the base station through the total power resource, including the power common for all (or a subset of the) links, the invention offers a more efficient power control mechanism. A major advantage is that it can be used to ensure that no attempts are made on the network side to allocate more power resources than available. Hence, the risk of temporary running out of transmitter power can be eliminated, resulting in a preserved system stability.

Another advantage of the technology is that it enables a smooth response to power increase requests from the user equipment. The allocated power can be made to rise smoothly when the maximum transmitter power is approached, which leads to a more controlled behavior of the base station transmitter power. The control is preferably performed on a comparatively small time scale, which results in fast adjustments as the overall power situation changes.

By performing power control at the network side and considering the overall power situation for the base station, the present technology thus improves the system stability. The improved stability in turn results in an enhancement of both the capacity and the quality of the services experienced by the users. Wireless communication systems in general are associated with trade-offs between coverage, quality and load. Hereby, a key issue is to balance service coverage against system stability, i.e. optimize the resource (base station downlink powers) utilization, such that a good service coverage is obtained at low loads and a good system stability is obtained at high loads. The present technology enables the above factors to be properly balanced, e.g. by reducing the coverage or providing a soft degeneration of the quality when the load increases.

According to a particularly advantageous example embodiment, the power control parameter is determined by a combination of the total transmitter power (downlink carrier power) of the base station and the connection-specific transmitter power (downlink code power). The power control is then related to the connection-specific resource utilization in addition to the overall resource utilization of all links. Thereby, power saturation can be avoided and besides the smooth transitional behavior at high total transmitter powers (i.e. close to $P_{DL,max}$) it is also possible to make distinctions between different connections. Connections using a lot of code power can for example be "punished" through stronger power restrictions. Moreover, this solution is normally easy to implement and does not require any additional signaling (e.g.

between RNC and Node B in WCDMA) since both the carrier power and the code power can be measured at the base station.

The means for imposing power restrictions are preferably to adapt the maximum dedicated code power $p_{i,max}$; to state a probability $\pi_i$ of granting a power change request command; and/or to adapt the power step size $\Delta_i$. Exemplary embodiments with power control by means of each of these respective power control parameters will now be described. The exemplifying power control algorithms work for values both in linear [W] and logarithmic scale [dBW or dBm], but values in linear scale will be assumed if nothing else is stated.

Maximum Dedicated Code Power

A preferred means to reduce the possibility of a connection to contribute to the downlink carrier power is to decrease the maximum dedicated code power $p_{i,max}$, i.e. the upper power limit of an individual dedicated channel. The computed maximum dedicated code power can be seen as a function of the total transmitter downlink power $P_{DL}$: $p_{i,max}=f(P_{DL})$. When most of the downlink power is allocated, each connection is typically further limited by a lower maximum dedicated code power. The higher the downlink carrier power, the tighter the maximum code power.

In a first example reflected by Equation (4), the maximum dedicated code power can vary from $p_{max,lower}$ to $p_{max,upper}$, and depends linearly on the downlink carrier power, when the latter is greater than $P_{DL,low}$ and less than $P_{DL,max}$. Otherwise, $p_{i,max}=p_{max,upper}$.

$$p_{i,max}=p_{max,upper}-(p_{max,upper}-p_{max,lower})*(P_{DL}-P_{DL,low})/(P_{DL,max}-P_{DL,low}) \quad (4)$$

A second example reflected by Equation (5) presents a simpler method where the maximum dedicated code power can have two different values depending on whether the carrier power is below a threshold $P_{DL,low}$ or not.

$$p_{i,max} = \begin{cases} p_{max,upper} & P_{DL} < P_{DL,low} \\ p_{max,lower} & P_{DL} \geq P_{DL,low} \end{cases} \quad (5)$$

It should be noted that $P_{DL}$ may be used together with one or more other input parameters for determining the maximum downlink code power. When more than one input are used, each input can be used to compute the maximum power, and the aggregate of these computed values is used as the maximum dedicated code power. In an exemplifying embodiment with two different inputs, the aggregate is computed according to (6).

$$p_{i,max,aggregate}=\min(p_{i,max,input\,1},p_{i,max,input\,2}) \quad (6)$$

Power Increase Probability

In the default power control algorithm in WCDMA, the base station increases the dedicated channel power by a step $\Delta$ upon receiving a transmitter power up command from the wireless unit. Only the maximum dedicated code power $p_{i,max}$ can hinder the power increase due to be granted. According to a preferred example embodiment, grant of a received power up command is instead associated with an assigned probability $\pi_{inc,i}$ (possibly zero), referred to as a power increase probability.

When most of the downlink carrier power is allocated, there are good reasons for being more careful with increasing the power solely based on the power increase request from the wireless unit. Hence, it is often desirable to let a higher the downlink carrier power lead to a lower power increase probability. If a power up request is not granted there are two options. Either the connection-specific transmitter power $p_i(t)$ remains at the same level, or it is decreased by the step $\Delta$. The latter is more efficient in penalizing a connection.

In a first example (7) the power increase depends linearly on the downlink carrier power, when the latter is greater than $P_{DL,low}$ and less than $P_{DL,max}$. Otherwise, $\pi_{inc,i}=1$. (n is a parameter.)

$$\pi_{inc,i}=1-((P_{DL}-P_{DL,low})/(P_{DL,max}-P_{DL,low}))^n \quad (7)$$

Figure 4A:
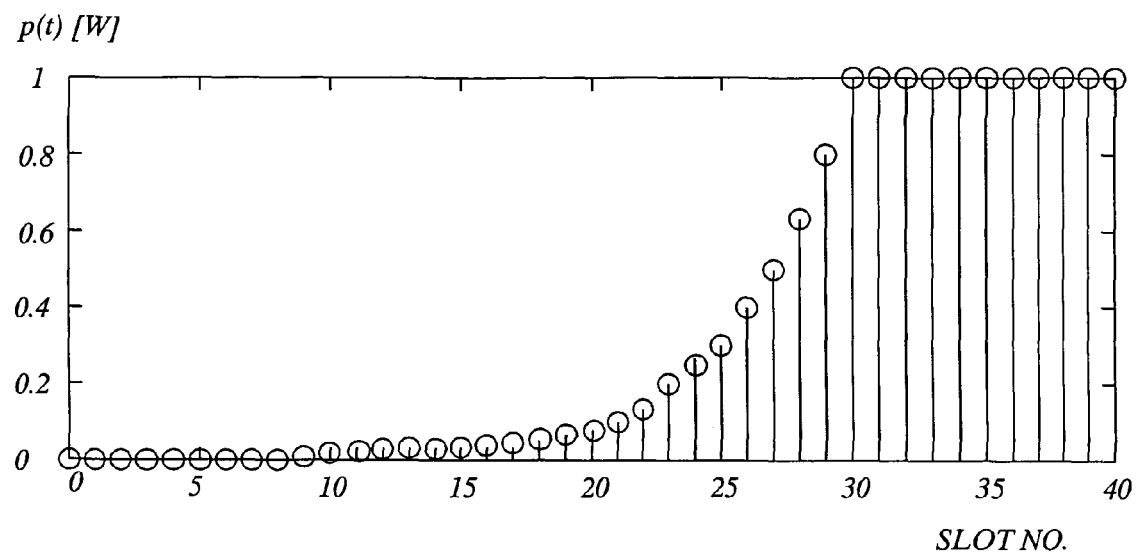
FIGS. 4A-B are diagrams illustrating code power and code power increase obtained with conventional power control.
Figure 4B:
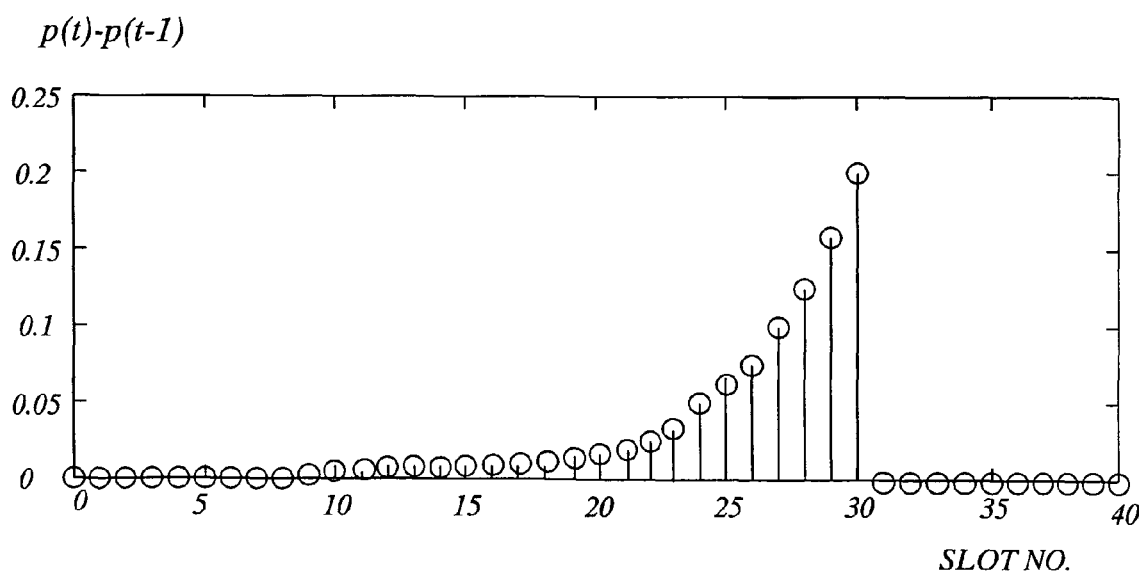

FIGS. 4 and 5 illustrate load-based downlink power control with power increase probability as power control parameter as compared with conventional default power control. FIGS. 4A-4B show the prior-art code power behavior for a connection to a wireless unit that is consistently asking for more power. The base station allocates power to the connection in accordance with the standardized control algorithm of Eq. (1) and (2). FIG. 4A contains normalized code power values for the respective time slots, whereas FIG. 4B shows the power changes since the last slot. The diagrams clearly show the linear scale effects of the logarithmic scale power control (1). The power upsteps in Watt increase exponentially as the code power of the connection increases (before saturation at slot 30). This constitutes an instabilizing property of the conventional power control algorithm.

Figure 5A:
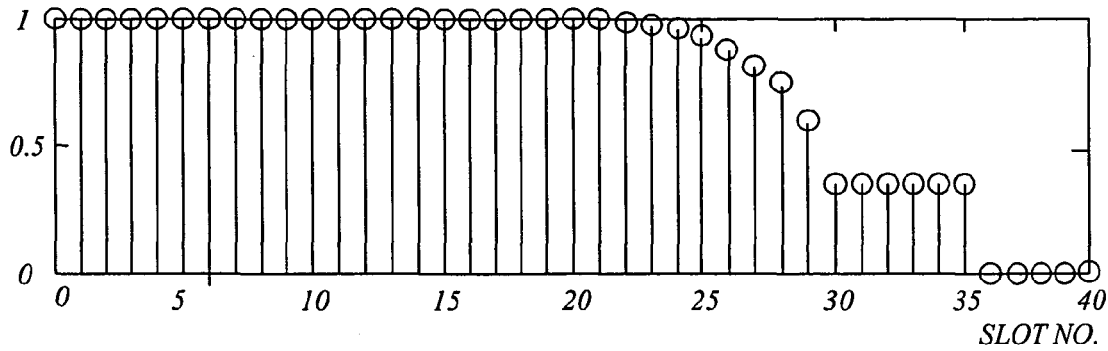
FIGS. 5A-C are diagrams illustrating power increase probability, code power and code power increase in accordance with an exemplary embodiment.
Figure 5B:
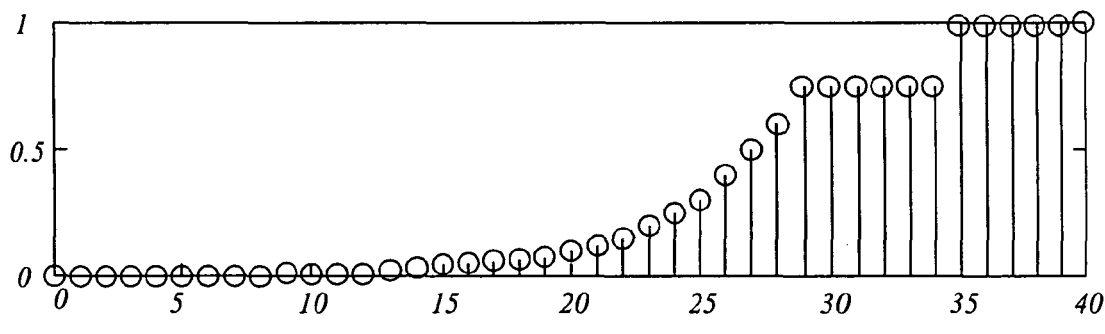
Figure 5C:
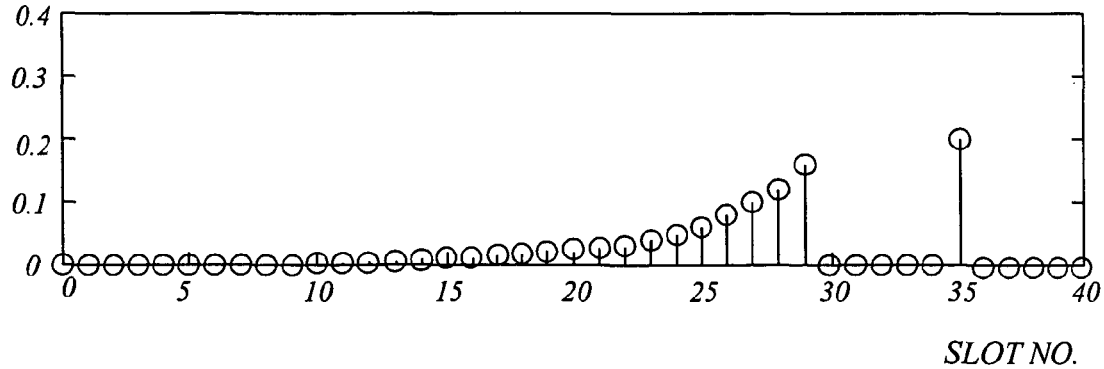

The dramatic increase can be made more graceful using the load based power control of the present technology. FIG. 5A shows power increase probability according to equation (7) with n=2. FIGS. 5B-5C corresponds to FIGS. 4A-4B but this time the power control is performed based on $P_{DL}$ and code power through the power control probabilities of FIG. 5A. The power increase probability decreases as the code power and carrier power increases, and this in turn makes the power control more graceful while approaching the maximum code and carrier powers.

A second example reflected by Equation (8) presents a simpler method where the power increase probability switches between 1 and another fixed value $\pi_{inc,lower}$ depending on whether the carrier power is below $P_{DL,low}$ or not.

$$\pi_{inc,i} = \begin{cases} 1 & P_{DL} < P_{DL,low} \\ \pi_{inc,lower} & P_{DL} \geq P_{DL,low} \end{cases} \quad (8)$$

When most of the downlink code power is allocated, there are good reasons for being more careful with increasing the power. As mentioned above, an advantageous example embodiment performs power control based on both the total transmitter power of the base station and the connection specific transmitter power. Applied to the case where the power increase probability is used as power control parameter, this means that the power increase probability is a function of both the downlink carrier power and the downlink code power: $\pi_{inc,i}=f(P_{DL},p_i)$. In such a case, a higher downlink code power generally implies a lower power increase probability. In an exemplifying embodiment reflected by Equation (9), the aggregated power increase probability is the product of the power increase probabilities computed separately using downlink carrier power and the downlink code power:

$$\pi_{inc,i,aggregate}=\pi_{inc,i,PDL}*\pi_{inc,i,pi} \quad (9)$$

The second example reflected by Equation (11) uses a simpler method where the power increase probability switches between 1 and another fixed value $\pi_{inc,lower}$ depending on whether the carrier power is below $p_{low}$ or not.

$$\pi_{inc,i} = \begin{cases} 1 & p_i < p_{low} \\ \pi_{inc,lower} & p_i \geq p_{low} \end{cases} \quad (11)$$

Other power control algorithms where the total transmitter power is used as an input together with one or several other inputs are possible. When more than one input are used, each input can be used to compute the power increase probability, and the aggregate of these computed values is used as the power increase probability. In an example with three different inputs, the aggregate is computed according to Equation (12). Inputs 2 and 3 can (but do not have to) include the connection-specific transmitter power.

$$\pi_{inc, i, aggregate} = \pi_{inc, i, PDL} * \pi_{inc, i, input 2} * \pi_{inc, i, input 3} \quad (12)$$

Power Control Step Size

In the default power control algorithm in WCDMA, the base station increases the dedicated channel power by a fixed step $\Delta$ in dB, when receiving a power up TPC command from the mobile terminal. Only the maximum dedicated code power can hinder the power increase.

The present technology instead proposes to adapt the power control step $\Delta$ in response to the total downlink power at the base station: $\Delta_i = f(P_{DL})$. The size of the power change (upward or downward) may be either decreased or increased. A power increase request from the mobile terminal may even result in zero or negative values of $\Delta$, thus corresponding to a refused increase command. Since only the upward steps are critical for downlink stability, it can sometimes be preferred to limit the step size adaptation to upward steps, while letting the downward steps remain constant.

Sometimes, e.g. if it is not possible to adjust the step size directly, it may be advisable to adjust the power only each N:th slot, where $N = \text{floor}(\Delta_{norm}/\Delta_{desired})$ and $\Delta_{norm}$ is a possible adjustment step (e.g. 1 dB).

When most of the downlink carrier power is allocated, one should be careful with increasing the power entirely conformant to the power increase commands. With power control according to the present technology, a higher downlink carrier power generally results in a lower upward step size. In an exemplifying embodiment the upward step size depends linearly on the downlink carrier power and decreases to zero when the carrier power approaches its maximum level. This is illustrated by equation (13) where $\Delta_{param}$ is a parameter and $\Delta_{norm}$ is the maximum power step size.

$$\Delta_i = \min(\Delta_{norm}, \Delta_{param}(P_{DL,max} - P_{DL})/P_{DL,max}) \quad (13)$$

Moreover, in some cases it can be motivated to use different steps upwards and downwards. Longer steps upward and shorter steps downward at low loads, and vice versa. In an exemplifying embodiment the upward and downward step sizes are separately adjusted and depend linearly on the downlink carrier power. The upward step decreases to zero when the carrier power approaches its maximum level, while the downward step decreases to zero at low carrier powers. This is illustrated by Equations below (14), where $\Delta_{param}$ is parameter, a parameter $\Delta_{norm}$ is the maximum power step size and $P_{DL,lower}$ is parameter indicating the lower carrier power level.

$$\Delta_{i,upward} = \min(\Delta_{norm}, \Delta_{param}(P_{DL,max} - P_{DL})/P_{DL,max})$$

$$\Delta_{i,downward} = \min(\Delta_{norm}, \Delta_{param}(P_{DL} - P_{DL,lower})/(P_{DL,max} - P_{DL,lower})) \quad (14)$$

As for the previously described control parameters, more than one input can be used to determine the step size. Hereby, each input can be used to calculate a respective step size, and the aggregate of these preliminary step size values is used as the step size through which the power control is effectuated. In an exemplifying embodiment with two different inputs, the aggregate is computed according to Equation (15).

$$\Delta_{i, aggregate} = \min(\Delta_{i, input 1}, \Delta_{i, input 2}) \quad (15)$$

An advantageous embodiment uses a combination of transmitted downlink code power and transmitted downlink carrier power: $\Delta_i = f(P_{DL}, p_{i,code})$. The step size can for example depend linearly on the downlink carrier power and the downlink code power [Watt] and decrease to zero when the carrier power and/or the code power approaches the maximum levels, as illustrated by equation (16).

$$\Delta_i = \min(\Delta_{norm}, \Delta_{param}(P_{DL,max} - P_{DL}) * (p_{i,max} - p_i)) \quad (16)$$

Figure 6:
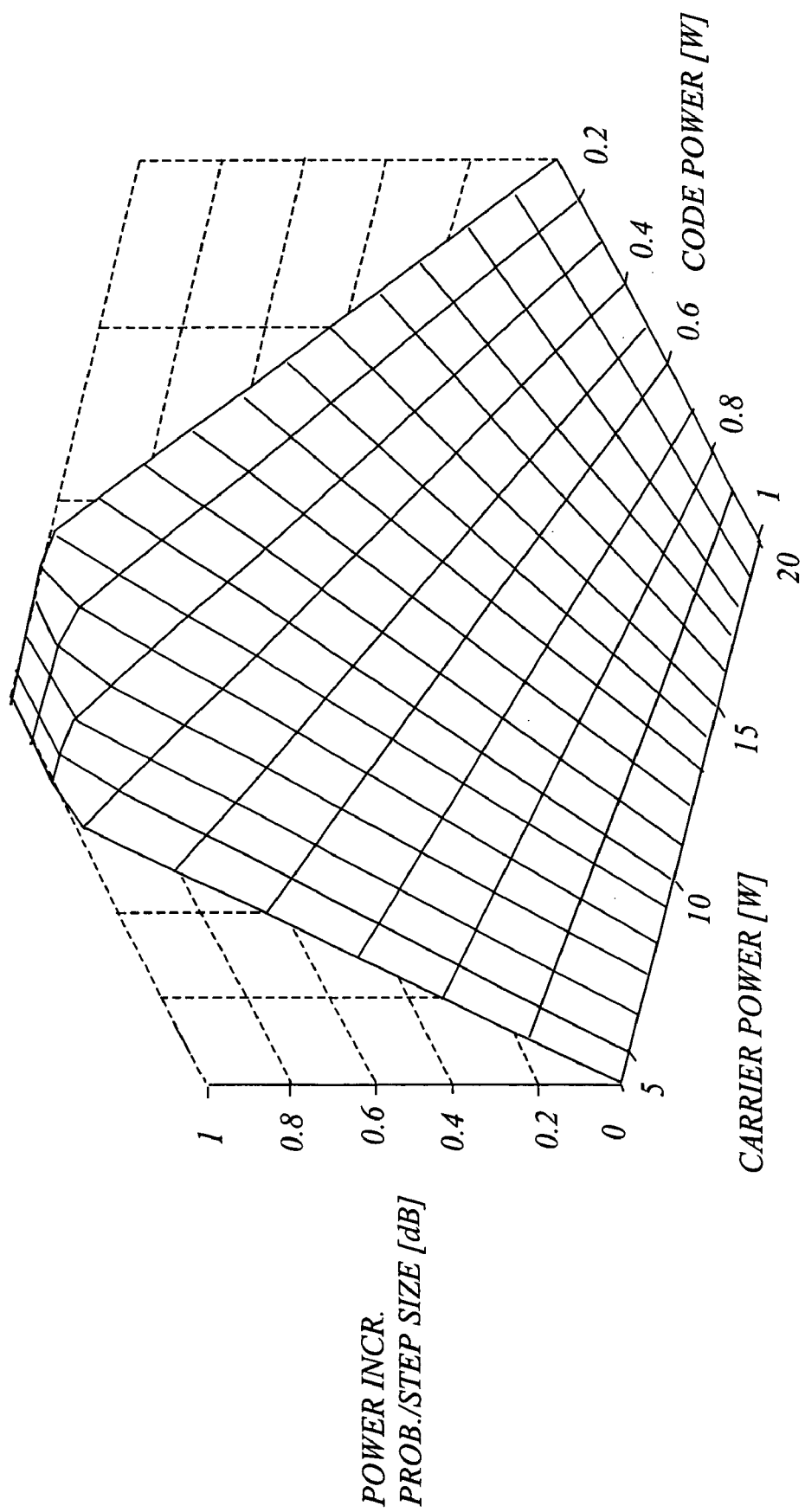
FIG. 6 is a diagram illustrating the relation between a power control parameter, code power and carrier power in accordance with an exemplary embodiment.

Power control with a combined downlink carrier power and downlink code power utilization according to Eq. (16) is illustrated in FIG. 6. Power step size vs. downlink carrier power and downlink code power is illustrated. In this example, the maximum carrier power $P_{DL,max}$ is 20 W, the maximum code power $p_{i,max}$ is 1 W, $\Delta_{param}=0.1$ dB and $\Delta_{norm}=1$ dB. It is evident that infinitesimal step sizes are applied at high carrier powers and/or at high code powers, and thereby efficiently preventing the system from dramatically increasing the powers at high loads. As indicated in FIG. 6, Eq. (16) can also be used for power control with power increase probability as code parameter.

The above results are directly applicable to such cases, in which infinitesimal power increase probabilities are hence applied at high carrier powers and/or at high code powers.

In some cases, it can be appropriate to normalize the power step size to maximum power values. This means that the system is more careful with increasing the power for high data rate services. Furthermore, in this way the algorithms can be made independent of base station maximum transmitter power and of type of bearers. Three examples:

$$\Delta_i = \min(\Delta_{norm}, \Delta_{param}(P_{DL,max} - P_{DL}) * (p_{i,max} - p_i)/p_{i,max}) \quad (17)$$

$$\Delta_i = \min(\Delta_{norm}, \Delta_{param}(P_{DL,max} - P_{DL}) * (p_{i,max} - p_i)/P_{DL,max}) \quad (18)$$

$$\Delta_i = \min(\Delta_{norm}, \Delta_{param}(P_{DL,max} - P_{DL}) * (p_{i,max} - p_i)/(p_{i,max} * P_{DL,max})) \quad (19)$$

As a numerical example, consider the services speech with $p_{i,max}$ 1 W and video telephony 64 kbps with $p_{i,max}$ 4 W. No normalization to maximum code power means that the step size is the same for both services at 0.5 W for speech and 3.5 W for video telephony. With normalization according to the above equations, the step size is the same at 0.5 W for speech and at 2 W for video telephony. This means that the system is more careful with increasing the powers for high data rate users.

Although different control algorithms have been used to exemplify the power control through power increase probability and power step size, respectively, the methods for one of these control parameters are generally applicable on the other as well. Thus, the equations for power step size adjustment can typically be used also for power increase probabilities, and vice versa.

The above examples have primarily used actual (not normalized) power parameters. However, sometimes, e.g. for base stations with different maximum downlink carrier power, it can be relevant to consider the downlink carrier power relative the maximum carrier power as the input. Similarly, in some situations, for example when different connections have different maximum downlink code power, it can be relevant to consider the downlink code power relative maximum code power as the input to algorithms based on code power. The methods will work the same if a carrier power parameter is replaced by the same parameter divided by the maximum downlink carrier power and a code power parameter is replaced by the same parameter divided by the maximum downlink code power, respectively.

Moreover, since the input power data typically varies fast and heavily, it can in many cases be advisable to use filters in connection with the described downlink power control functions. By considering current as well as previous values of the input parameters (e.g. $P_{DL}$ and $p_i$), the variance can with filtering be reduced such that the power control parameters are subject merely to slowly changing input data.

According to another preferred example embodiment, the downlink power control is based on a combination of the total transmitter power and the degree of priority associated with the respective connections. The main idea is to avoid a situation where all connections experience unsatisfactory quality of service by adopting a proactive strategy to penalize some connections to save others. The power control parameters used to distribute transmitter power to a particular connection are in this case determined based on the total transmitter power together with connection-specific information indicating the degree of priority associated with the connection. The connection-specific information preferably comprises one or more so-called degree of priority indicators DPI. Hence, the power p, dedicated to connection i depends on $P_{DL}$ and the DPI parameter for the connection $DPI_i$.

The DPI parameter is representing the importance/relevance/priority of a particular connection at a particular point of time in a predefined way. It generally describes features or the current or expected behavior of the end user/mobile terminal and can comprise user-related, device-related and/or connection-descriptive information. The priority indicating parameter is typically measured or collected from data holding units or databases at the network side, preferably by means of a network-based control unit, such as an RNC. Some example priority indicators:

Mobile Type and Class

Some types of mobile terminals require more power from the base station than other when providing the same service in the same radio environment. The type of mobile terminal can therefore be useful as priority indicator. Hereby, the brand or model of the mobile terminal can be used. However, a preferred embodiment suggests that the classification of mobiles is automatized. The actual performance or power requirement of the mobile terminal is then determined at the network side and based thereon the terminal is classified, e.g. using information about the required downlink code power when connected to a specific reference cell; IMIE number; and or block error rate (for data services). The automatic classification can be based on stored or measured connection-related information.

Subscription Class

When it is desirable to prioritize one or a number of subscription classes in front of others, the subscription class $s_i$ is a useful input, e.g. enabling for operators to offer gold subscriptions with better services to customers that pay more.

Connection Time

The longer the mobile terminal has been connected, the more critical it is to penalize the connection. Therefore, the time since connection establishment $t_c$ is an informative input.

Data Service Features

For data services it can often be appropriate to use the current values of certain data service features, providing information about the current and expected user behavior, as a basis for the prioritization between different connections. Such parameters would typically be measured at the network side, preferably at the RNC, and can e.g. include indicators related to the transmitted data amount, the expected data amount, and/or the data amount residing in buffers before being transmitted. Hereby, a larger amount of data generally implies a higher degree of priority associated with the connection. Moreover, the power distribution can be based on one or more DPI related to packet features, such as packet length (longer packets are prioritized), packet type, and/or time since last packet, as well as DPI related to block error statistics and/or block retransmission statistics.

By performing downlink power control based on a combination of the total transmitter power and the degree of priority associated with the respective connections, an improved system stability can be achieved on a short term as well as on a long term basis. This example embodiment allows for a more sophisticated power control mechanism and a more "fair" power distribution.

The power control of the invention is thus preferably performed using the above-described power control parameters $p_{i,max}$, $\pi_{inc,i}$ and $\Delta_i$. Hereby, one single control parameter or, alternatively, a combination of two or all control parameters can be used for a particular power control situation. There may also be example embodiments where the power control is effectuated through other power-related parameters, including other parameters directly or indirectly related to a power change rate of the connection-specific transmitter power.

In connection with data services, a quality target of the connection can be used as power control parameter, instead of or in addition to the above parameters. The quality target specifies the desired quality of a connection. An example is the block error rate (BLER) quality target of WCDMA, i.e. the ratio between the number of erroneous blocks and the total number of transmitted blocks.

Although the invention has been described with reference to specific illustrated embodiments, it should be emphasized that it also covers equivalents to the disclosed features, as well as modifications and variants obvious to a man skilled in the art. Thus, the scope of the invention is only limited by the enclosed claims.

REFERENCES

[1] 3GPP, Physical layer procedures (FDD), Technical Specification TS 25.214.
[2] Gunnarsson, F. and Gustafsson, F., Power Control with Time Delay Compensation, *Proc. Vehicular Technology Conference*, Boston, Mass., USA, September 2000.
[3] U.S. Pat. No. 5,574,982, M. Almgren, et. al.
[4] International Patent Application WO 02/35731 A1, Telefonaktie-bolaget L. M. Ericsson.
[5] International Patent Application WO 00/04649, Nokia Networks OY.
[6] European patent application EP 0 815 656 B1, Nokia Corporation.
[7] U.S. Pat. No. 6,311,070 B1, Wen Tong, Rui. R. Wang.

The invention claimed is:

1. A method for power control in a communication system including a transceiver node capable of communicating with multiple mobile terminals, comprising the acts of:

receiving, at the transceiver node, a transmitter power change request from one of the mobile terminals over a wireless connection;

measuring a current total transmitter power of the transceiver node, the current total transmitter power representing substantially all downlink power resources, common and connection-specific, used at the transceiver node at a particular point of time;

determining, at the transceiver node, at least one power control parameter for the connection based on the current total transmitter power of the transceiver node and on a current connection-specific transmitter power for the connection, said determining further comprising executing a predetermined power control function presenting a smooth transitional behavior as the current total transmitter power of the transceiver node approaches a maximum total transmitter power value; and distributing transmitter power to the connection in accordance with the determined power control parameter, wherein the power control parameter is directly or indirectly related to a power change rate of the connection-specific transmitter power.

2. The method of claim 1, further comprising the steps of measuring the current total transmitter power at the transceiver node.

3. The method of claim 1, wherein the total transmitter power is a downlink carrier power and the connection-specific transmitter power is a downlink code power.

4. The method of claim 1, wherein the determining step is further based on connection-specific information indicating the degree of priority associated with the connection.

5. The method of claim 4, wherein the connection-specific information comprises information selected from the group of: mobile type, mobile class, subscription class, connection time, transmitted data amount, data amount in buffer, packet length, packet type, time since last packet, block error statistics, and block retransmission statistics.

6. The method of claim 1, wherein the power control parameter is related to a power change step size.

7. The method of claim 1, comprising the steps of combining, at the transceiver node, at least two power control parameters based on different input parameters into an aggregate power control parameter; and using the aggregate power control parameter for distributing the connection-specific transmitter power in the distributing step.

8. The method of claim 1, wherein the determining step involves deciding the power control parameter based on a predetermined threshold value for the total transmitter power.

9. The method of claim 1, wherein the determining step is based on current and previous values of the total transmitter power.

10. A method for power control in a communication system including a transceiver node capable of communicating with multiple mobile terminals, comprising the acts of:

receiving, at the transceiver node, a transmitter power change request from one of the mobile terminals over a wireless connection;

measuring a current total transmitter power of the transceiver node, the current total transmitter power representing substantially all downlink power resources, common and connection-specific, used at the transceiver node at a particular point of time;

determining, at the transceiver node, at least one power control parameter for the connection based on the current total transmitter power of the transceiver node and on a current connection-specific transmitter power for the connection, said determining further comprising executing a predetermined power control function presenting a smooth transitional behavior as the current total transmitter power of the transceiver node approaches a maximum total transmitter power value; and distributing transmitter power to the connection in accordance with the determined power control parameter, wherein the power control parameter is related to a probability of grant.

11. A transceiver node capable of communicating with multiple mobile terminals in a communication system with means for power control, comprising:

means for receiving a transmitter power change request from one of the mobile terminals over a wireless connection;

means for measuring a current total transmitter power of the transceiver node, the current total transmitter power representing substantially all downlink power resources, common and connection-specific, used at the transceiver node at a particular point of time;

means for determining at least one power control parameter for the connection based on the current total transmitter power of the transceiver node and on a current connection-specific transmitter power for the connection, said determining means are adapted for executing a predetermined power distribution function presenting a smooth transitional behavior as the current total transmitter power of the transceiver node approaches a maximum total transmitter power value;

means for distributing transmitter power to the connection in accordance with the determined power control parameter, wherein the power control parameter is directly or indirectly related to a power change rate of the connection-specific transmitter power.

12. The transceiver node of claim 11, further comprising means for measuring the total transmitter power and the connection-specific transmitter power.

13. The transceiver node of claim 11, further comprising means for determining the power control parameter based on connection-specific information indicating the degree of priority associated with the connection.

14. The transceiver node of claim 11, wherein the power control parameter is related to a power change step size.

15. The transceiver node of claim 11, comprising means for combining at least two power control parameters based on different input parameters into an aggregate power control parameter; and means for using the aggregate power control parameter for adjustments of connection-specific transmitter power.

16. The transceiver node of claim 11, wherein the means for determining involves means for deciding the power control parameter based on a predetermined threshold value for the total transmitter power.

17. The transceiver node of claim 11, comprising a base station unit.

18. A communication system provided with means for power control and including a transceiver node capable of communicating with multiple mobile terminals, comprising:

means for receiving, at the transceiver node, a transmitter power change request from one of the mobile terminals over a wireless connection;

means for measuring a current total transmitter power of the transceiver node, the current total transmitter power representing substantially all downlink power resources, common and connection-specific, used at the transceiver node at a particular point of time;

means for determining at least one power control parameter for the connection based on the current total transmitter power of the transceiver node and on a current connection-specific transmitter power for the connection; said determining means are adapted for executing a predetermined power distribution function presenting a smooth transitional behavior as the current total transmitter power of the transceiver node approaches a maximum total transmitter power value;

means for distributing transmitter power to the connection in accordance with the determined power control parameter, wherein the power control parameter is directly or indirectly related to a power change rate of the connection-specific transmitter power.

19. The communication system of claim 18, further comprising means for determining the power control parameter based on a current connection-specific transmitter power for the connection.

20. The communication system of claim 18, further comprising means for determining the power control parameter based on connection-specific information indicating the degree of priority associated with the connection.

21. The communication system of claim 18, further comprising means for transmitting the connection-specific information from a network-based control unit of the communication system to the transceiver node.

22. The communication system of claim 18, wherein the power control parameter is related to a power change step size.

23. The communication system of claim 18, being selected from the group of: a Code Division Multiple Access (CDMA) system, a Wideband Code Division Multiple Access (WCDMA) system, an Orthogonal Frequency Division Multiplexing (OFDM) system, and a system using Multi Carrier Power Amplifiers (MCPA).

24. A transceiver node capable of communicating with multiple mobile terminals in a communication system with means for power control, comprising:

means for receiving a transmitter power change request from one of the mobile terminals over a wireless connection;

means for measuring a current total transmitter power of the transceiver node, the current total transmitter power representing substantially all downlink power resources, common and connection-specific, used at the transceiver node at a particular point of time;

means for determining at least one power control parameter for the connection based on the current total transmitter power of the transceiver node and on a current connection-specific transmitter power for the connection, said determining means are adapted for executing a predetermined power distribution function presenting a smooth transitional behavior as the current total transmitter power of the transceiver node approaches a maximum total transmitter power value;

means for distributing transmitter power to the connection in accordance with the determined power control parameter, wherein the power control parameter is related to a probability of grant.

25. A communication system provided with means for power control and including a transceiver node capable of communicating with multiple mobile terminals, comprising:

means for receiving, at the transceiver node, a transmitter power change request from one of the mobile terminals over a wireless connection;

means for measuring a current total transmitter power of the transceiver node, the current total transmitter power representing substantially all downlink power resources, common and connection-specific, used at the transceiver node at a particular point of time;

means for determining at least one power control parameter for the connection based on the current total transmitter power of the transceiver node and on a current connection-specific transmitter power for the connection; said determining means are adapted for executing a predetermined power distribution function presenting a smooth transitional behavior as the current total transmitter power of the transceiver node approaches a maximum total transmitter power value;

means for distributing transmitter power to the connection in accordance with the determined power control parameter, wherein the power control parameter is related to a probability of grant.

26. The communication system of claim 25, being selected from the group of: a Code Division Multiple Access (CDMA) system, a Wideband Code Division Multiple Access (WCDMA) system, an Orthogonal Frequency Division Multiplexing (OFDM) system, and a system using Multi Carrier Power Amplifiers (MCPA).

* * * * *

UNITED STATES PATENT AND TRADEMARK OFFICE
CERTIFICATE OF CORRECTION

PATENT NO. : 7,899,484 B2
APPLICATION NO. : 11/902659
DATED : March 1, 2011
INVENTOR(S) : Timus et al.

It is certified that error appears in the above-identified patent and that said Letters Patent is hereby corrected as shown below:

On Page 2, item (56), under "OTHER PUBLICATIONS", in Column 2, Line 2, delete "Conferenc" and insert -- Conference --, therefor.

On Page 2, item (56), under "OTHER PUBLICATIONS", in Column 2, Line 6, delete "Bubmitted" and insert -- Submitted --, therefor.

In Column 1, Line 4, delete "no" and insert -- now --, therefor.

In Column 1, Line 50, delete "with." and insert -- with --, therefor.

In Column 4, Line 14, in Equation (2),
delete "$=\max(p\_{lower,min}(p\_{upper,p}(t)+d*TPC(t)))$" and
insert -- $=\max(p\_{lower,min}(p\_{upper,p}(t)+\Delta*TPC(t)))$ --, therefor.

In Column 7, Line 29, in Equation (4), delete "$(p_{max,upper}-p_{max,lowed})$" and insert -- $(p_{max,upper}-p_{max,lower})$ --, therefor.

In Column 8, Line 64, below Equation (9), insert -- The factor $\pi_{inc,i},p_i$ can for instance be calculated according to equation (10) or (11) below. In the first example (10), the power increase depends linearly on the dedicated code power $p_i$, when the latter is greater than $p_{low}$ and less than $p_{max,i}$. Otherwise, $\pi_{inc,i}=1$ (n is a parameter.)
$\pi_{inc,i}=1-((p_i-p_{low})/(p_{max,i}-p_{low}))^n$       (10) --, as a new paragraph.

In Column 9, Line 59, delete "parameter, a parameter" and insert -- a parameter, --, therefor.

In Column 10, Line 15, Equation (16), delete "$(p_{i,max}-p_i)$" and insert -- $(p_{i,max}-p_i))$ --, therefor.

In Column 11, Line 29, delete "p," and insert -- $p_i$ --, therefor.

Signed and Sealed this
Thirtieth Day of August, 2011

David J. Kappos
*Director of the United States Patent and Trademark Office*